United States Patent [19]
Armellino

[11] Patent Number: 5,662,149
[45] Date of Patent: Sep. 2, 1997

[54] FUEL SPILL COLLECTOR DEVICE

[76] Inventor: Gary Armellino, 12330 Houston Ave., Talbot Island, Fla. 32226

[21] Appl. No.: 419,047

[22] Filed: Apr. 10, 1995

[51] Int. Cl.⁶ .................................................. B65B 3/00
[52] U.S. Cl. ................ 141/86; 141/98; 141/286; 220/86.2; 114/343
[58] Field of Search ...................... 141/86, 88, 98, 141/312, 286; 220/86.1, 86.2; 114/343

[56] References Cited

U.S. PATENT DOCUMENTS

| | | | |
|---|---|---|---|
| 2,718,344 | 9/1955 | Troster | 141/86 |
| 3,467,274 | 9/1969 | Schmitt | 220/86.2 |
| 4,079,952 | 3/1978 | Nishio et al. | 220/86.2 X |
| 4,770,317 | 9/1988 | Podgers et al. | 141/86 X |
| 5,074,343 | 12/1991 | Tyree, Jr. | 141/300 |
| 5,168,908 | 12/1992 | Boyem | |
| 5,217,052 | 6/1993 | Sharp | 141/86 |
| 5,230,372 | 7/1993 | Westphal | 141/86 |
| 5,277,234 | 1/1994 | Warstler | |
| 5,322,099 | 6/1994 | Langlois | 141/86 X |
| 5,385,180 | 1/1995 | Wittman | |
| 5,503,199 | 4/1996 | Whitley, II et al. | 141/312 |

*Primary Examiner*—J. Casimer Jacyna
*Attorney, Agent, or Firm*—Michael I. Kroll

[57] ABSTRACT

A fuel spill collector device comprising a hollow body having an open top end and a open bottom end. An exit flow guide member is at the open bottom end of the hollow body. An entrance flow guide member is at the open top end of the hollow body spout of a fuel pump nozzle inserted into the entrance flow guide member and positioned into or past the exit flow guide member can pump fuel through a fuel filler line. The device will prevent a fuel spill, catch a fuel back splash, suppress fumes and greatly decrease fueling time by utilizing venturi and gravitational return effects.

1 Claim, 3 Drawing Sheets

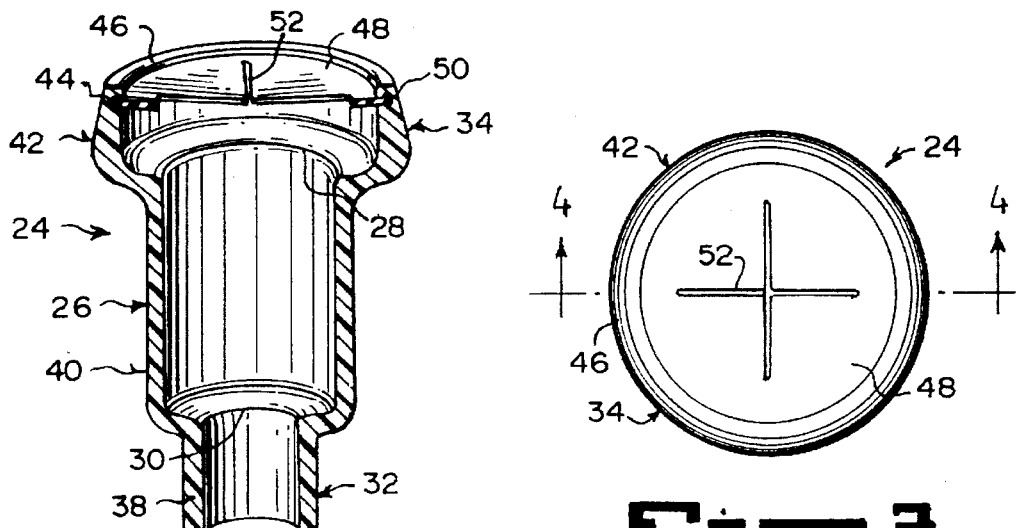
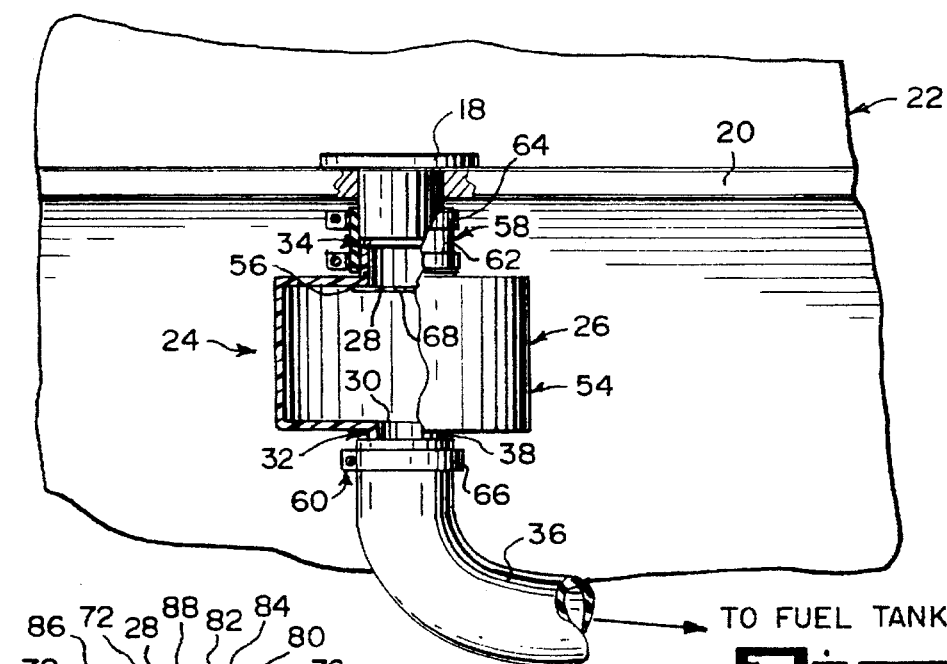
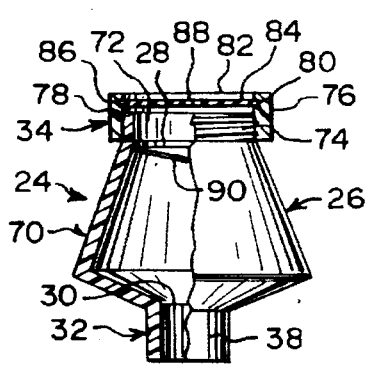
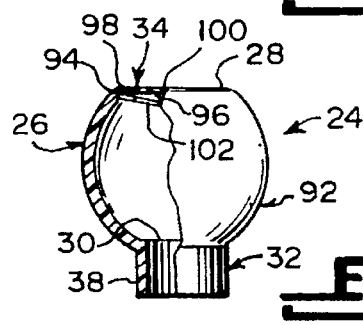

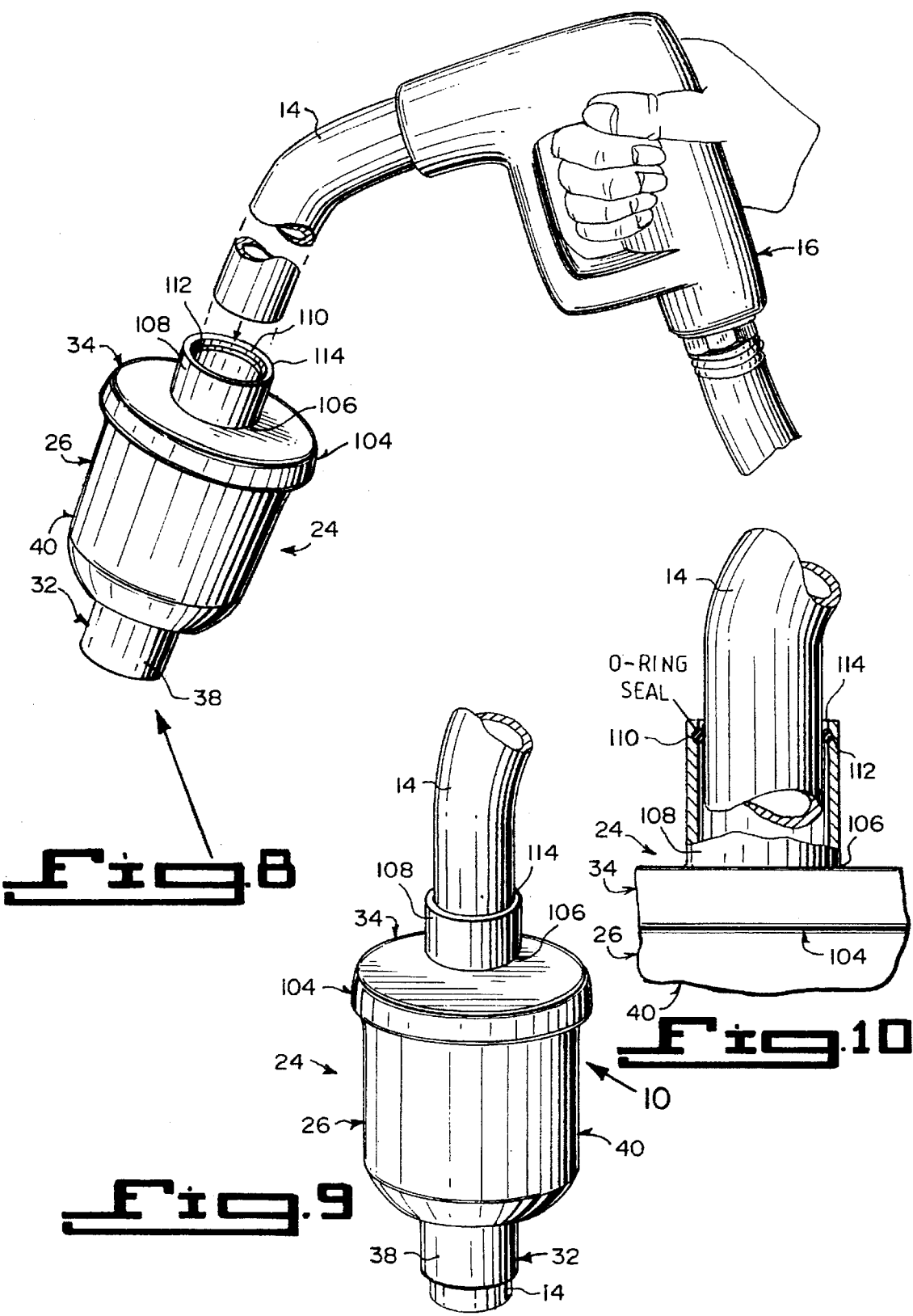

FUEL SPILL COLLECTOR DEVICE

BACKGROUND OF THE INVENTION

1. Field of the Invention

The instant invention relates generally to funnels and more specifically it relates to a fuel spill collector device.

2. Description of the Prior Art

Numerous funnels have been provided in prior art. For example, U.S. Pat. Nos. 5,074,343 to Tyree, Jr.; 5,168,908 to Boyum; 5,277,234 to Warstler and 5,385,180 to Wittman all are illustrative of such prior art. While these units ma be suitable for the particular purpose to which they address, they would not be as suitable for the purposes of the present invention as heretofore described.

Tyree Jr., Lewis

FILLER FOR SMALL TANKS OR THE LIKE

U.S. Pat. No. 5,074,343

Filling units for filling small tanks or the like with gasoline, kerosene, or other flowable materials which attach an inlet to such a tank. When the filling unit is in a fill position, a displacer section occupies a substantial volume within the tank. It allows the person filling the tank to supply the liquid until the tank will accept no more and the liquid reaches a predetermined level in a funnel portion of the filler. Thereafter, removal of the displacer section from the tank, as by sliding a section of the overall unit upward, allows the liquid in the funnel to enter the tank and fill the volume evacuated by the displacer section to complete the filling without any spillage. The overall unit may be removed from the tank each filling operation, or it may be designed to include a protective cap that fits over the upward protruding portion of the unit, allowing the unit to remain mounted on the tank.

Boyum, Glenn

NON-SPILL FUNNEL

U.S. Pat. No. 5,168,908

A non-spill funnel for introducing liquids and flowable materials into tanks or containers which includes a bowl which is integrally formed with a pour spout or nozzle. The nozzle includes an outwardly spaced arcuate flange which extends in spaced relationship thereto, for purposes of engaging the sidewall of the fill spout opening into the tank or container, so as to retain the nozzle against the sidewall thereof. A visual inspection may be made as to the level of liquid or other flowable material relative to the opening.

Warstler, Christopher L.

SELF VENTING FUNNEL

U.S. Pat. No. 5,277,234

A funnel includes a truncated conical funnel head directed into a cylindrical guide conduit. The guide conduit and funnel head are oriented about a predetermined axis. A plurality of spaced parallel channels are directed into the funnel head. The guide conduit extends from a lowermost end of the funnel structure to an uppermost end thereof permitting venting when the funnel is directed within an opening of an associated container.

Wittman, Boyd

LIQUID SAVER FUNNEL SYSTEM

U.S. Pat. No. 5,385,180

A spill inhibiting funnel system is described that has stepped fins and blades extending, respectively, from the outer and inner surfaces of a tapered funnel body. The fins allow the funnel to be variably positioned with respect to a receiving container's opening in a secure fashion to prevent spills. Likewise, the stepped blades allow a pouring container to be securely placed inside the funnel and remain there in an inverted upright or angled position.

SUMMARY OF THE INVENTION

A primary object of the present invention is to provide a fuel spill collector device that will overcome the shortcomings of the prior art devices.

Another object is to provide a fuel spill collector device that will prevent a fuel spill when a spout of a fuel pump nozzle is inserting fuel through a fuel filler line.

An additional object is to provide a fuel spill collector device that will also catch a fuel back splash, suppress fumes and greatly decrease fueling time, by utilizing venturi and gravitational return effects.

A further object is to provide a fuel spill collector device that is simple and easy to use.

A still further object is to provide a fuel spill collector device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is a top view of the first embodiment per se, taken in the direction of arrow 3 in FIG. 2.

FIG. 4 is a perspective cross sectional view taken generally along line 4—4 in FIG. 3.

FIG. 5 is an elevational view with parts broken away and in section of a second embodiment of the instant invention permanently installed between the fuel fill fitting and fuel line of the boat below the deck.

FIG. 6 is an elevational view with parts broken away and in section of a third embodiment of the instant invention.

FIG. 7 is an elevational view with parts broken away and in section of a fourth embodiment of the instant invention.

FIG. 8 is a perspective view of a fifth embodiment of the instant invention ready to be installed onto the spout of the fuel pump nozzle.

FIG. 9 is a perspective view of the fifth embodiment installed onto the spout of the fuel pump nozzle.

FIG. 10 is an enlarged elevational view with parts broken away and in section taken in the direction of arrow 10 in FIG. 9, showing the O-ring seal in greater detail.

Similar reference characters denote corresponding features consistently throughout the attached drawings.

DETAILED DESCRIPTION OF THE PREFERRED EMBODIMENTS

Figure 1:
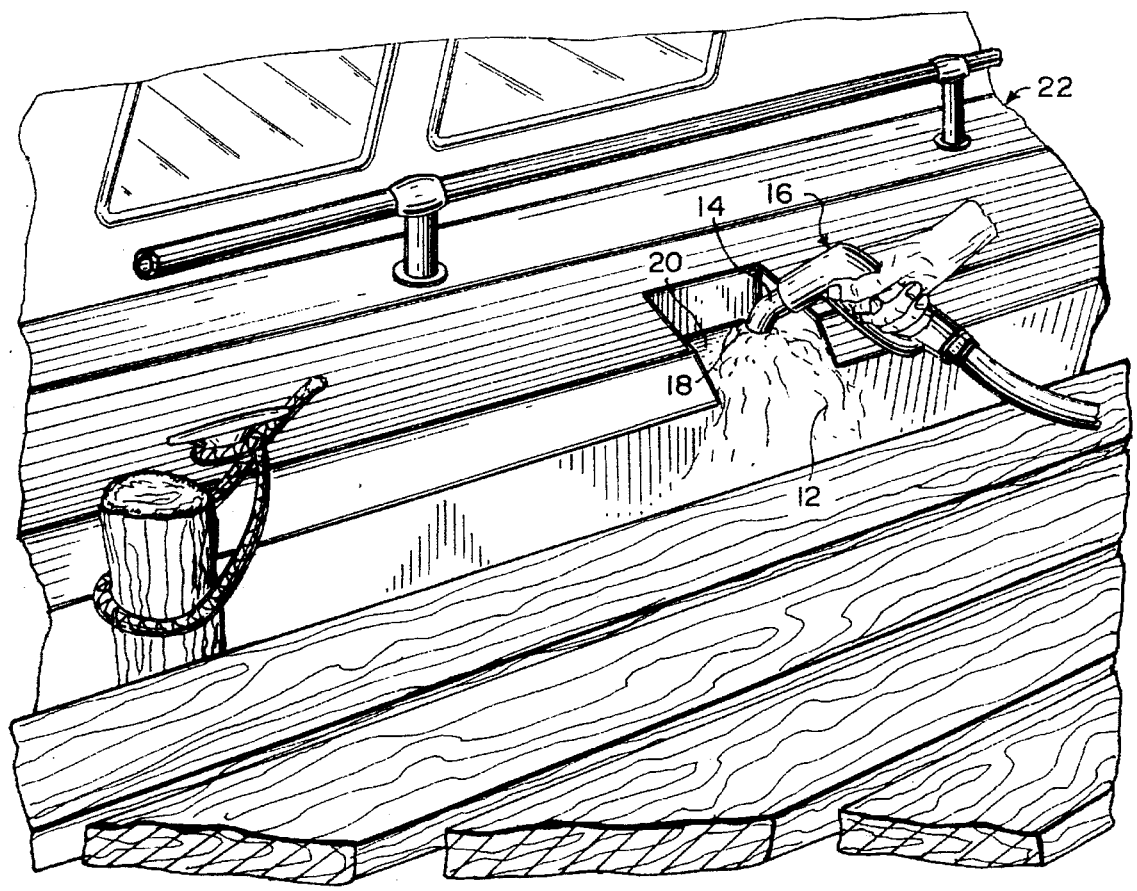
FIG. 1 is a perspective view of the prior art, showing a portion of a boat with a fuel pump nozzle spilling some fuel out of a fuel fill fitting.

Turning now descriptively to the drawings, in which similar reference characters denote similar elements throughout the several views, FIG. 1 illustrates the prior art. A fuel spill 12 is coming out of a spout 14 of a fuel pump nozzle 16 from a fuel fill fitting 18 on a deck 20 of a boat 22.

FIGS. 2 through 10 show the instant invention being a fuel spill collector device 24 comprising a hollow body 26 having an open top end 28 and a open bottom end 30. An exit flow guide member 32 is at the open bottom end 30 of the hollow body 26. An entrance flow guide member 34 is at the open top end 28 of the hollow body 26. The spout 14 of the fuel pump nozzle 16 inserted into the entrance flow guide member 34 and positioned into or past the exit flow guide member 32 can pump fuel through a fuel filler line 36. The device 24 will prevent the fuel spill 12, catch a fuel back splash, suppress fumes and greatly decrease fueling time by utilizing venturi and gravitational return effects.

The exit flow guide member 32 is a lower cylindrical collar 38 integral with and extending about said open bottom end of said hollow body. The hollow body 26, shown in FIGS. 2, 4 and 8 through 10 is a cylindrical cup-shaped housing 40, in which the diameter of the open top end 28 is larger than the diameter of the open bottom end 30. The lower cylindrical collar 38 is sized to fit into the fuel fill fitting 18 on the fuel filler line 36, which is connected to a fuel tank (not shown).

Figure 2:
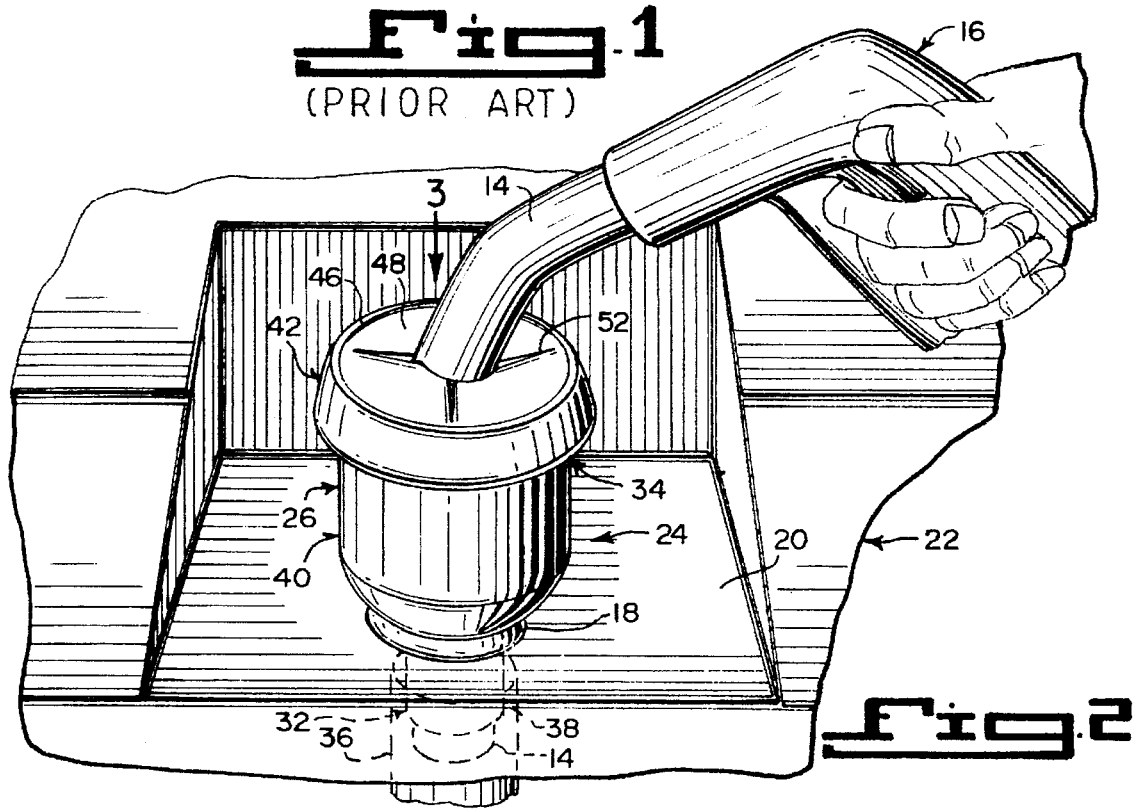
FIG. 2 is a perspective view of a first embodiment of the instant invention placed into the fuel fill fitting of the boat with the spout of the fuel pump nozzle inserted into the entrance flow guide member and all the way through, so as to prevent a fuel spill.

The entrance flow guide member 34 in FIGS. 2, 3 and 4, consists of an upper cylindrical collar 42 integral with and extending about the open top end 28 of the hollow body 26. The upper cylindrical collar 42 has an internal ring-shaped groove 44 near its upper edge 46. A disk-shaped flexible cover 48 with a bead 50 about a peripheral edge is carried in an affixed manner within the ring-shaped groove 44. The cover 48 has a cross-shaped slot therethrough, to receive the spout 14 of the fuel pump nozzle 16.

In FIG. 5, the hollow body 26 is a cylindrical drum-shaped housing 54, in which the diameter of the open top end 28 is of the same size as the diameter of the open bottom end 30. The entrance flow guide member 34 is an upper cylindrical collar 56, integral with and extending about the open top end 28 of the hollow body 26.

A facility 58 is for connecting the upper cylindrical collar 56 to a bottom end of a fuel fill fitting 18. A facility 60 is for connecting the lower cylindrical collar 38 to a top end of the fuel filler line 36.

The first connecting facility 58 includes a flexible tube 62 extending between the bottom end of the fuel fill fitting 18 and the upper cylindrical collar 56. A pair of hose clamps 64 are provided. Each hose clamp 64 will seal the flexible tube 62 between the bottom end of the fuel fill fitting 18 and the upper cylindrical collar 56. The second connecting facility 60 is a hose clamp 66, to seal the lower cylindrical collar 38 within the top end of the fuel filler line 36. A deflector plate 68 is carried in the hollow body 26 below the open top end 28, to help divert the fuel entering therein.

In FIG. 6, the hollow body 26 is a truncated conical housing 70. The diameter of the open top end 28 is larger than the diameter of the open bottom end 30. The lower cylindrical collar 38 is sized to fit into the fuel fill fitting 18 on the fuel filler line 36. The entrance flow guide member 34 includes an upper cylindrical collar 72 integral with and extending about the open top end 28 of the hollow body 26. The upper cylindrical collar has external threads 74 thereabout.

A cylindrical sleeve 76 is provided having internal threads 78. The cylindrical sleeve 76 can thread onto the upper cylindrical collar 72. The cylindrical sleeve 76 further has an internal ring-shaped groove 80 near its upper edge 82.

A disk-shaped flexible cover 84 with a bead 86 about a peripheral edge is carried in an affixed manner within the ring-shaped groove 80. The cover 84 has a cross-shaped slot 88 therethrough, to receive the spout 14 of the fuel pump nozzle 16. The entrance flow guide member 34 further includes a deflector plate 90, carried in the hollow body 26 below the open top end 28, to help divert the fuel entering therein.

In FIG. 7, the hollow body 26 is a ball-shaped housing 92. The diameter of the open top end 28 is larger than the diameter of the open bottom end 30. The lower cylindrical collar 32 is sized to fit into the fuel fill fitting 18 on the fuel filler line 36. The entrance flow guide member 34 consists of the open top end 28 of the hollow body 26 having an internal ring-shaped groove 94 thereabout. A disk-shaped flexible cover 96 with a bead 98 about a peripheral edge is carried in an affixed manner within the ring-shaped groove 94. The cover 96 has a cross-shaped slot 100 therethrough, to receive the spout 14 of the fuel pump nozzle 16. A deflector plate 102 is carried in the hollow body 26 below the open top end 28, to help divert the fuel entering therein.

In FIGS. 8, 9 and 10, the entrance flow guide member 34 includes a cylindrical cap 104, having a central aperture 106 therethrough. The cap 104 snaps onto the open top end 28 of the hollow body 26. A short tube 108 extends upwardly from the central aperture 106 in the cylindrical cap 104. The short tube 108 has an internal annular channel 110 thereabout U-shaped in cross section and is sized to receive the spout 14 of the fuel pump nozzle 16. An O-ring 112 is carried within the annular U-shaped channel 110 in the short tube 108 near an upper open end 114. The spout 14 of the fuel pump nozzle 16 will snugly seal fit about the short tube 108 and extend out of the lower cylindrical collar 38. The O-ring 112 will prevent fuel coming out of the spout 14 from backing out of the short tube 108.

The drawings show the device 10 used in the boat 22, in which the fuel fill fitting 18 is mounted into the deck 20. Other motor vehicles, such as automobiles, trucks, vans, motorcycles, etc. can utilize the device 10, to prevent fuel spills.

In the below deck 20 installation, as shown in FIG. 5, the shape of the fuel spill collector device 24 may vary to allow for the penetration of the spout 14 of the fuel pump nozzle 16. It will also accommodate any side wall or stringer restrictions. The fuel spill collector device 24 may be circular and thinner from top to bottom, or thinner, wider and offset. The principle function of the invention applies in almost any type of configuration, when the spout 14 of the fuel pump nozzle 16 is inserted all the way through.

LIST OF REFERENCE NUMBERS 12 fuel spill
14 spout
16 fuel pump nozzle
18 fuel fill fitting
20 deck
22 boat
24 fuel spill collector device
26 hollow body of 24
28 open top end of 26
30 open bottom end of 26
32 exit flow guide member at 30
34 entrance flow guide member at 28
36 fuel filler line
38 lower cylindrical collar for 32
40 cylindrical cup-shaped housing for 26
42 upper cylindrical collar for 34
44 internal ring-shaped groove in 42
46 upper edge of 42
48 disk-shaped flexible cover
50 bead on 48
52 cross-shaped slot in 48
54 cylindrical drum-shaped housing for 26
56 upper cylindrical collar for 34
58 first connecting facility
60 second connecting facility
62 flexible tube of 58
64 hose clamp of 58
66 hose clamp for 60
68 deflector plate in 54
70 truncated conical housing for 26
72 upper cylindrical collar of 34
74 external threads on 72
76 cylindrical sleeve of 34
78 internal threads on 76
80 internal ring-shaped groove in 76
82 upper edge of 76
84 disk-shaped flexible cover
86 bead on 84
88 cross-shaped slot in 84
90 deflector plate in 70
92 ball-shaped housing for 26
94 ring-shaped groove in 28
96 disk-shaped flexible cover
98 bead on 96
100 cross-shaped slot in 96
102 deflector plate in 92
104 cylindrical cap of 34
106 central aperture in 104
108 short tube of 34
110 internal annular U-shaped channel in 108
112 O-ring in 110
114 upper open end of 108

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fuel spill collector device comprising a) a hollow body being a drum-shaped housing having an opening in the top end and an opening in the bottom end of equal diameters in said housing, said housing located below and spaced from a fuel fill fitting;

b) an exit flow guide member comprising a lower cylindrical collar integral with said housing, surrounding and extending down from said bottom opening;

c) an entrance flow guide member comprising an upper cylinder collar integral with said housing, surrounding extending up said top opening;

d) means for connecting said upper cylindrical collar to the bottom end of said fuel fill fitting comprising flexible tube extending between the bottom end of said fuel fill fitting and the top of said upper cylindrical collar and a pair of hose clamps sealing the flexible tube between the bottom end of the fuel fill fitting and the upper cylindrical collar;

e) means for connecting said lower cylindrical collar to fuel filler line comprising a hose clamp to seal said lower cylindrical collar to the top end of said fuel filler line;

f) said drum-shaped housing having a diameter larger than the diameters of said upper and lower cylindrical collars; and g) a deflector plate mounted in said housing below the top opening to help divert fuel entering therein and prevent a fuel pill, catch a fuel back plash, and suppress fumes when a fuel pump nozzle is inserted into aid fuel fill fitting.

\* \* \* \* \*